United States Patent
Wang et al.

(10) Patent No.: US 6,398,983 B1
(45) Date of Patent: Jun. 4, 2002

(54) FLUORESCENT MATERIAL FOR PACKAGING OPTICAL DEVICES

(75) Inventors: Bily Wang; Bill Chang, both of Hsin-Chu (TW)

(73) Assignee: Harvatek Corporation, Hsin-Chu (TW)

( * ) Notice: Subject to any disclaimer, the term of this patent is extended or adjusted under 35 U.S.C. 154(b) by 15 days.

(21) Appl. No.: 09/758,812

(22) Filed: Jan. 12, 2001

(51) Int. Cl.$^7$ ................................................ C09K 11/02
(52) U.S. Cl. ............................. 252/301.36; 252/301.36
(58) Field of Search ...................... 252/301.36, 301.35

(56) References Cited

FOREIGN PATENT DOCUMENTS

JP          8-3550        *   1/1996

* cited by examiner

Primary Examiner—C. Melissa Koslow
(74) Attorney, Agent, or Firm—H. C. Lin Patent Agent

(57) ABSTRACT

A solid state epoxy powder and a solid state fluorescent powder material are mixed in a fixed ratio for application over the surface of an optical device. When the mixture is heated into liquid form and then cooled down, the mixture forms a fluorescent coating which emits colorless light when optical device is excited.

5 Claims, 2 Drawing Sheets

FLUORESCENT MATERIAL FOR PACKAGING OPTICAL DEVICES

BACKGROUND OF THE INVENTION (1) Field of the Invention

This invention relates to optical semiconductor device package, particularly to the packaging material for fluorescent semiconductor devices, (2) Brief Description of Related Art The prior art method for implementing a fluorescent semiconductor device is to coat the optical device with a mixture of two liquid materials, liquid epoxy and anhydride, and a fluorescent powder in a fixed ratio (X1:Y1:Z1) as shown in FIG. 1 to yield a "uniform liquid fluorescent material". For application, the uniform liquid fluorescent is used to coat the surface of the optical chip. After the fluorescent liquid is solidified, the optical chip can emit a "colorless light" when energized, because the light energy from the chip can excite the electronics in the molecules of the fluorescent material.

Such a procedure is inconvenient to use, because it involves the mixing of two liquid materials and a powder prior to application.

SUMMARY OF THE INVENTION

An object of this invention is to use a single solid state resin material to replace prior art the liquid state mixing of fluorescent material. Another object is to simplify the packaging procedure in applying the fluorescent material on an optical semiconductor chip.

These objects are achieved by using two kinds of solid state powders: the epoxy powder and the fluorescent powder.

DETAILED DESCRIPTION OF THE INVENTION

Figure 1:
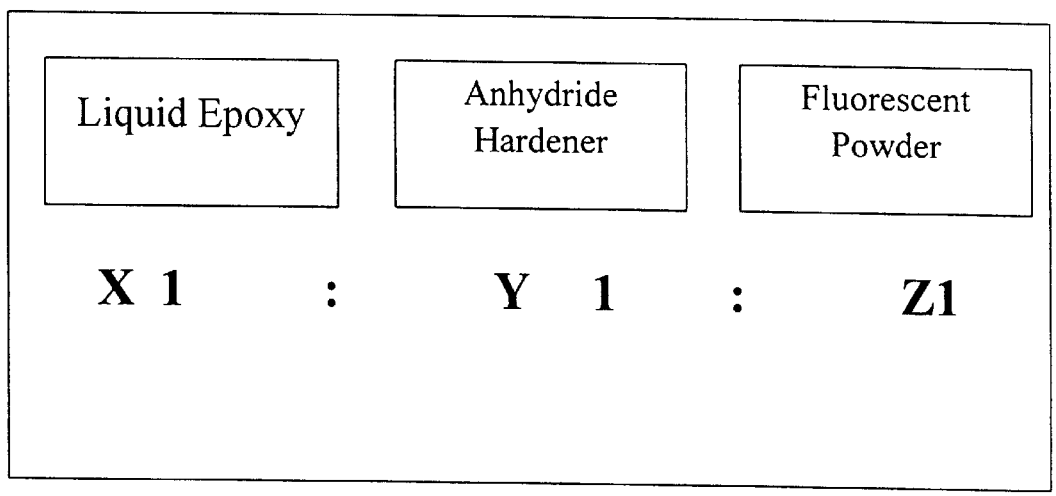
FIG. 1 shows the prior art mixture of liquid fluorescent material.
Figure 2:
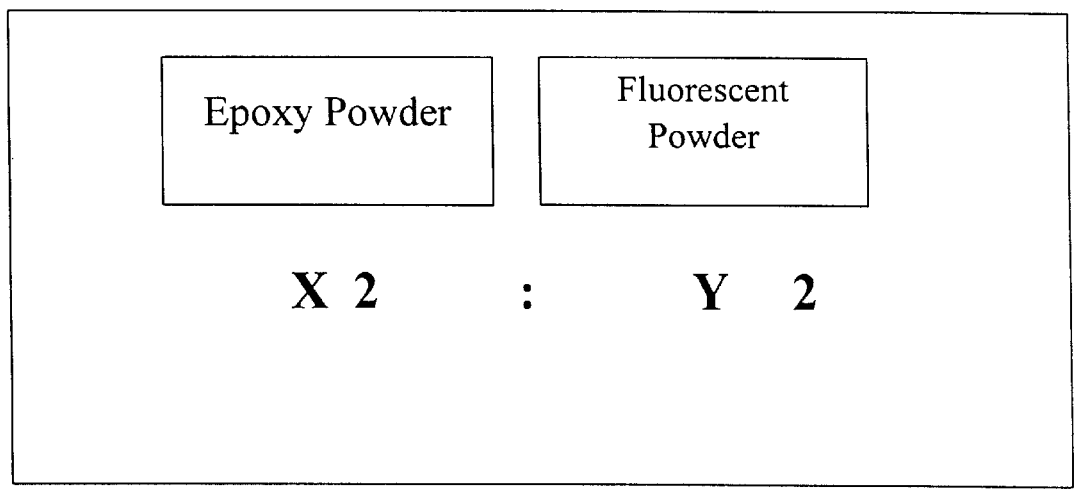
FIG. 2 shows the solid mixture of fluorescent material based on the present invention.

FIG. 2 shows the mixture two kinds of solid-state powders: a solid state epoxy (X2) and another solid fluorescent powder (Y2). The solid state epoxy is ground into powder form. The fluorescent powder may be cerium doped yttrium aluminum oxide ($Y_3Al_5O_{12}$:Ce). The X2 powder and the Y2 powder are mixed in a fixed ratio ready to be used. During application, the "uniform power fluorescent material" is heated to a liquid form sealing over the surface of an optical chip. After solidification, the optical chip becomes fluorescent. When the chip is energized to emit a primary light, the light energy excites the electrons of the material to emit a "colorless light".

A practical ratio for the mixed powder is use a ratio of X2:Y2 be 6:1. The uniform powder fluorescent material can be pressed into solid cakes for easy transport. Other ratio of X2:Y2 5–7:1 may also be used to yield different fluorescent effect.

While the preferred embodiment has been described, it will be apparent to those skilled in this art that various modifications may be made in these embodiments without departing from the spirit of the present invention. Such modifications are all within the scope of this invention.

What is claimed is:

1. A fluorescent material for coating an optical semiconductor device, comprising:

a solid state epoxy powder;

a solid state fluorescent powder;

said solid state epoxy and said solid state fluorescent material being mixed for application to the surface of an optical device, heated into liquid form, solidified on the surface of said optical device after cooling, and emitting colorless light when said optical device is excited.

2. A fluorescent material as described in claim 1, wherein said solid state fluorescent material is cerium doped yttrium aluminum oxide ($Y_3Al_5O_{12}$:Ce).

3. A fluorescent material as described in claim 2, wherein said solid state epoxy powder and said fluorescent powder are mixed in a ratio of 5–7:1.

4. A fluorescent material as described in claim 3, when the ratio is 6:1.

5. A fluorescent material as described in claim 1, wherein said solid state epoxy powder and said fluorescent material are pressed into a cake.

* * * * *